(12) United States Patent
Moore et al.

(10) Patent No.: US 8,328,912 B2
(45) Date of Patent: Dec. 11, 2012

(54) AIR DRYER FOR ELECTRICAL ENCLOSURES

(75) Inventors: Douglas Moore, Epping, NH (US); William D. Howes, Danville, NH (US); Karli M. Raymond, Freemont, NH (US); Paul E. Smith, Chester, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 374 days.

(21) Appl. No.: 12/708,605

(22) Filed: Feb. 19, 2010

(65) Prior Publication Data

US 2010/0212502 A1    Aug. 26, 2010

Related U.S. Application Data

(60) Provisional application No. 61/153,993, filed on Feb. 20, 2009.

(51) Int. Cl.
*B01D 53/22* (2006.01)

(52) U.S. Cl. ............... 96/8; 95/45; 95/52; 96/4; 96/7; 96/10

(58) Field of Classification Search .......... 95/45, 52; 96/4, 7, 8, 10
See application file for complete search history.

(56) References Cited

U.S. PATENT DOCUMENTS

| | | | |
|---|---|---|---|
| 3,339,351 A * | 9/1967 | Carmichael, Jr. et al. | ... 55/350.1 |
| 4,666,469 A * | 5/1987 | Krueger et al. | ............ 95/54 |
| 5,411,662 A | 5/1995 | Nicolas, Jr. et al. | |
| 5,525,143 A | 6/1996 | Morgan et al. | |
| 5,605,564 A | 2/1997 | Collins | |
| 5,622,857 A * | 4/1997 | Goffe | ............ 435/378 |
| 6,585,808 B2 | 7/2003 | Burban et al. | |
| 6,616,735 B1 | 9/2003 | Burban et al. | |
| 6,740,140 B2 | 5/2004 | Giglia et al. | |
| 6,764,529 B2 | 7/2004 | Nichols et al. | |
| 6,923,845 B2 | 8/2005 | Nichols et al. | |
| 2001/0035092 A1* | 11/2001 | Hachimaki et al. | ............ 96/6 |
| 2002/0069758 A1* | 6/2002 | Burban et al. | ............ 96/8 |
| 2002/0162451 A1* | 11/2002 | Bikson et al. | ............ 95/51 |
| 2002/0162455 A1* | 11/2002 | Bikson et al. | ............ 96/8 |
| 2004/0000233 A1* | 1/2004 | Nichols et al. | ............ 95/52 |
| 2006/0090651 A1* | 5/2006 | Liu et al. | ............ 96/121 |
| 2008/0060517 A1 | 3/2008 | Nichols | |

FOREIGN PATENT DOCUMENTS

EP    2 226 112    2/2010

OTHER PUBLICATIONS

Extended European Search Report corresponding European Application No. 10154076.3 completed Sep. 9, 2010.

* cited by examiner

*Primary Examiner* — Jason M Greene
*Assistant Examiner* — Anthony Shumate
(74) *Attorney, Agent, or Firm* — Renner, Otto, Boisselle & Sklar, LLP

(57) ABSTRACT

An air dryer having an internal orifice designed into an outlet end cap that eliminates the need for external valves or regulators to control the flow of air through the dryer. The internal orifice, which can be press-fit or threaded into the end cap, provides a consistent and stable outlet flow and dew point and eliminates the need for instruments to measure outlet flow and dew point. The orifice size can be easily changed for changing outlet flow and dew point. A protective tubular shroud is provided for shielding a membrane module of the dryer, and for routing sweep gas to a bottom vent.

20 Claims, 9 Drawing Sheets

AIR DRYER FOR ELECTRICAL ENCLOSURES

RELATED APPLICATIONS

This application claims the benefit of U.S. Provisional Application No. 61/153,993 filed Feb. 20, 2009, which is hereby incorporated herein by reference.

FIELD OF THE INVENTION

The present invention relates generally to membrane gas dryers for drying a stream of gas and, more particularly, to membrane air dryers for drying compressed air.

BACKGROUND OF THE INVENTION

Food processing plants typically must be cleaned at regular intervals to comply with various governmental regulations intended to ensure food safety. In many food processing plants, this entails shutting down at least a portion of the plant and manually cleaning the plant using various detergents. In many cases, the detergents are applied by cleaning personnel via a hose or the like. In other cases, a fixed cleaning system including an array of nozzles may automatically wash down the plant.

In either case, during cleaning the potential exists for water and/or detergent solutions to enter electrical boxes within the plant associated with the food processing equipment. Since electrical components typically do not fare well when exposed to moisture, it is common to provide such electrical boxes with gaskets and other sealing elements in an attempt to make them waterproof. Regardless of such efforts, however, the opportunity remains for moisture to enter the boxes.

To address this issue, some food processing plants supply a stream of dry compressed air to each electrical box. Since compressed air is generally moisture-laden, membrane air dryers have been employed to dry the air after it is compressed. The dry air is then circulated through the boxes to absorb and remove any moisture therein.

Such dryers are known in the art of compressed gas systems and are devices that remove water from a compressed air system, specifically the water that exists in the vapor phase. The performance of such air driers, which typically contain a membrane module, is generally measured by the dewpoint suppression achieved as air passes through the module. The dewpoint is the temperature at which moisture will start to condense out of the moist air. Dewpoint suppression is the number of degrees the dew point is lowered as the air passes through the drier.

The dewpoint suppression is a function of the membrane area, feed flow rate, operating pressure and temperature, and sweep fraction. Membrane air dryers typically function by contacting one side of a semi-permeable membrane with a pressurized wet feed stream. The membrane preferentially allows water vapor to permeate therethrough resulting in a drying of the compressed air stream. A portion of the dried gas, commonly referred to as the "sweep", is fed back to contact the other side of the membrane and acts to sweep away the water moisture that has permeated the membrane. The sweep is often controlled by an externally mounted valve or an internal orifice. Such dryers typically employ an external valve or pressure regulator for controlling the flow of compressed air through the dryer.

SUMMARY OF THE INVENTION

An air dryer having an internal orifice designed into an outlet end cap that eliminates the need for external valves or regulators to control the flow of air through the dryer. The internal orifice, which can be press-fit or threaded into the end cap, provides a consistent and stable outlet flow and dew point. Preset outlet flow and dew point is more user friendly and eliminates the uncertainty associated with having to determine the outlet flow and dew point. This feature is especially advantageous in applications that lack the instruments to measure outlet flow and dew point, such as food processing plants. Another benefit is that the orifice size can be easily changed with a wrench thereby changing outlet flow and dew point, if so desired.

In addition, since known air dryers are generally not suitable for use in air drying systems of food processing plants where they can be exposed to harsh cleaning chemicals and/or can harbor food particles that can encourage bacteria growth and unsanitary conditions, the air dryer includes a protective sleeve in the form of a tubular shroud. The tubular shroud shields the membrane module from exposure to cleaning chemicals and provides an exterior surface that is easy to clean and is generally free of cavities for food to accumulate. The air dryer also includes an exhaust port for venting the sweep gas at a lower side thereof such that, when mounted, the sweep gas exhaust port can be shielded from infiltration by food particles and/or cleaning chemicals.

Accordingly, a membrane air dryer, comprises a tubular hollow fiber membrane module, a tubular shroud enclosing the hollow fiber membrane module, and an outlet end cap including an outlet end cap body connected to an outlet end of the hollow fiber membrane module, the outlet end cap body having a central aperture fluidly connected with an outlet end of the membrane module, and at least one flow path externally spaced from the aperture and fluidly connected with an external sweep air region formed between the tubular membrane module and the tubular shroud. The at least one flow path can be formed by a channel along the exterior surface of the outlet end cap body, and the flow path is defined between the outlet end cap body and shroud. The outlet end cap can include an orifice for regulating flow through the aperture from the outlet end of the hollow fiber membrane module. The outlet end cap can further include an orifice body fixed within the central aperture of the end cap body, and defining the orifice. The orifice body can be press-fit or threadably received within the central aperture. The outlet end cap can be removably connected to the membrane module.

The membrane air dryer can also include an inlet end cap including an inlet end cap body connected to an inlet end of the hollow fiber membrane module. A watertight seal can be provided between the inlet end cap and the tubular shroud. The tubular shroud can be captured between the inlet end cap and the outlet end cap.

In accordance with another aspect, a membrane air dryer comprises a tubular hollow fiber membrane module having an inlet, an outlet and a bundle of hollow fibers supported therein, at least one of the hollow fibers having an interior passageway for the flow of air through the module from an upstream end near the inlet to a downstream end near the outlet, the hollow fibers having interstitial spaces therebetween for the flow of a sweep gas, and an outlet end cap. The outlet end cap includes an end cap body connected to the outlet end of the membrane module, the end cap body having a central aperture fluidly connected with the outlet of the membrane module and having an orifice for regulating flow through the aperture from the outlet end of the membrane module. The orifice can be included in an orifice body fixed within the central aperture of the end cap body. The orifice body can be press-fit or threadedly received within the central aperture. The outlet end cap can be removably connected to the membrane module.

The membrane air dryer can further include a passageway for supplying a sweep gas to interstitial spaces between the hollow fibers, the passageway fluidly connecting the outlet of the membrane module to the interstitial spaces such that a portion of the air flowing through the hollow fibers can be utilized as sweep gas to remove moisture from the interstitial spaces. A sweep gas inlet orifice can be provided for controlling the flow of sweep gas through the passageway to the interstitial spaces.

An inlet end cap can also be provided including an end cap body attached to the inlet end of the membrane module, the inlet end cap and outlet end cap being secured to respective ends of the membrane module and in fluid communication with the interior passageways of the hollow fibers. A tubular shroud can surround the membrane module and extend between the inlet and outlet end caps, the tubular shroud and membrane module defining a longitudinally extending passageway for the flow of sweep gas. The membrane module can have at least one exhaust port for exhausting sweep gas from the within the membrane module into the longitudinally extending passageway, and the outlet end cap can have at least one exhaust channel through which the sweep gas can vent from the longitudinally extending passageway. The at least one exhaust channel can extend axially on an outer circumference of the outlet end cap body, the tubular shroud and outlet end cap being axially coextensive along a portion of the exhaust channel.

In accordance with another aspect, a method of assembling a membrane air dryer comprises the steps of connecting a first end cap to a first end of a tubular hollow membrane module, telescoping a tubular shroud over the membrane module, and attaching a second end cap to a second end of the tubular hollow membrane module while capturing the tubular shroud between the first and second end caps.

Further features of the invention will become apparent from the following detailed description when considered in conjunction with the drawings.

DETAILED DESCRIPTION

Figure 1:
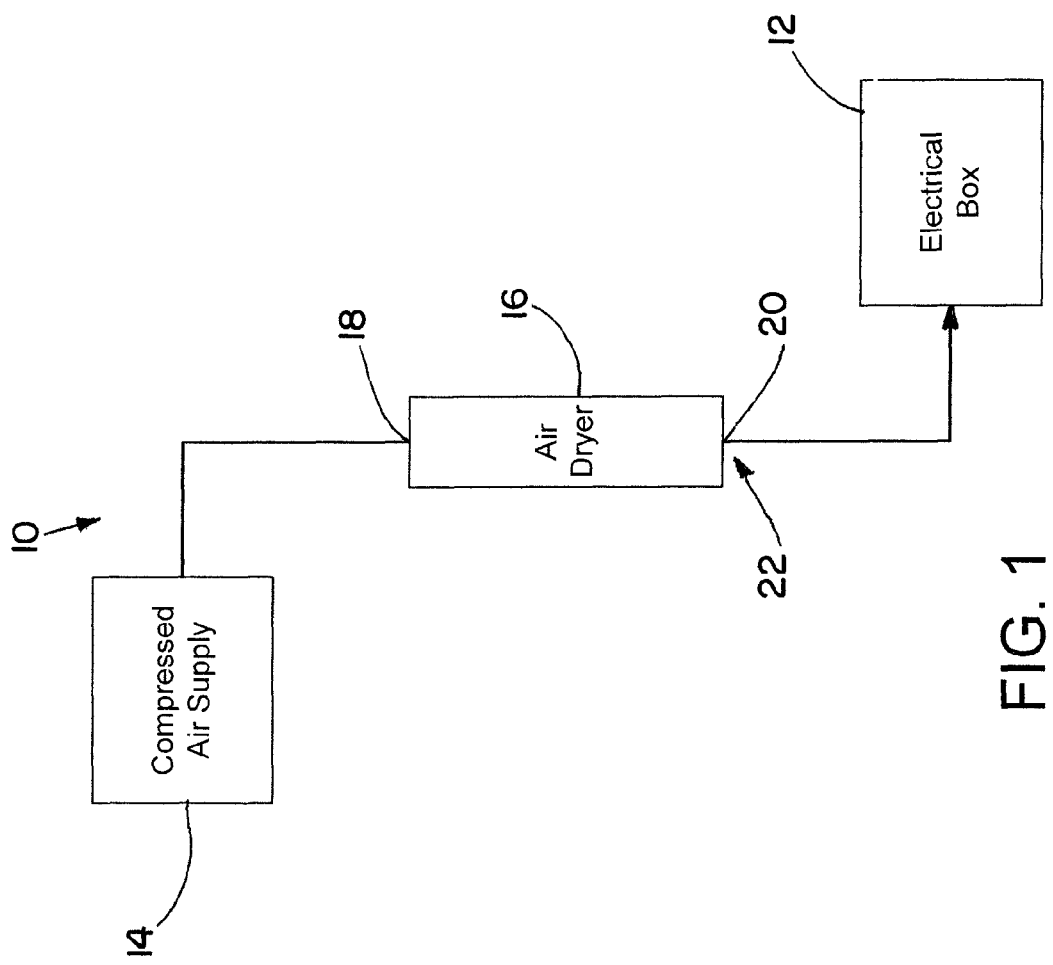
FIG. 1 is a schematic diagram of an air dryer systems including an exemplary air dryer in accordance with the invention.

In FIG. 1, an exemplary air drying system 10 for drying an electrical cabinet 12 is illustrated. The system 10 generally includes a compressed air supply 14, an air dryer 16, and electrical cabinet 12. Compressed air is delivered to an inlet 18 of the air dryer 16 from the supply 14. The air is dried as it passes through the air dryer 16 to outlet 20. The dry air is then fed to the electrical cabinet 12 where it absorbs and removes any moisture from within the cabinet. The air dryer 16 includes a sweep gas exhaust port 22 on its bottom side near the outlet 20 for exhausting the sweep gas from the air dryer 16. Although the air dryer 16 is shown and described in the context of a food processing plant air drying system, it will be appreciated that the air dryer 16 can be used in a wide variety of applications and can dry gasses other than air.

Figure 2:
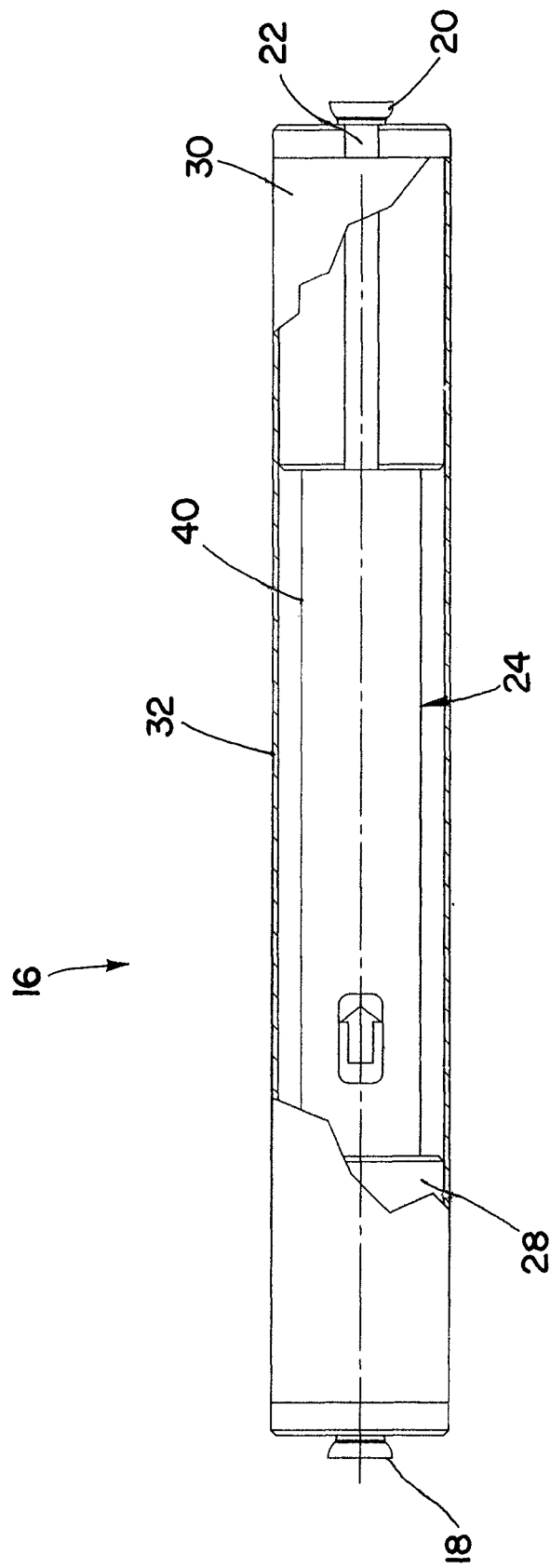
FIG. 2 is a partially cut-away view of an exemplary air dryer in accordance with the invention.
Figure 3:
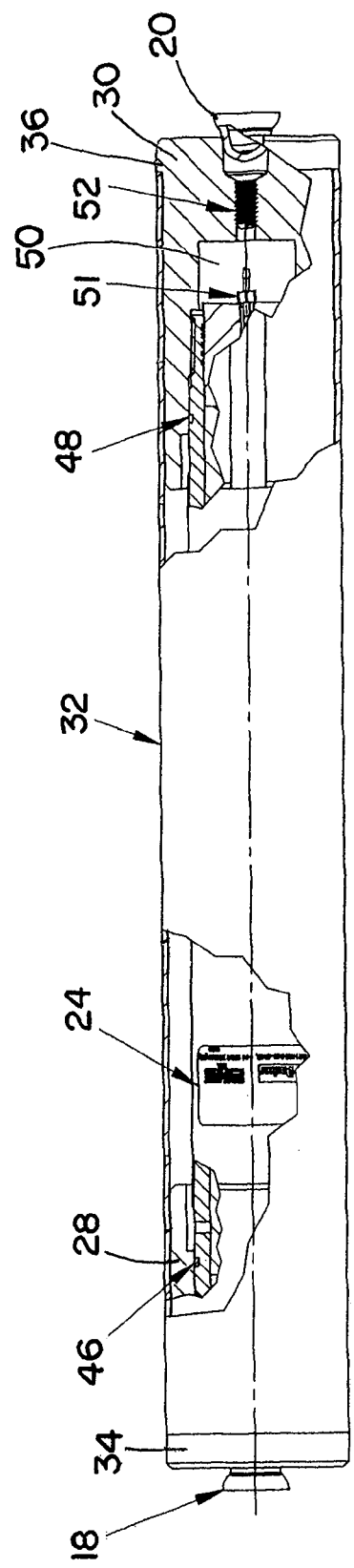
FIG. 3 is another partially cut-away view of the air dryer of FIG. 2.
Figure 8:
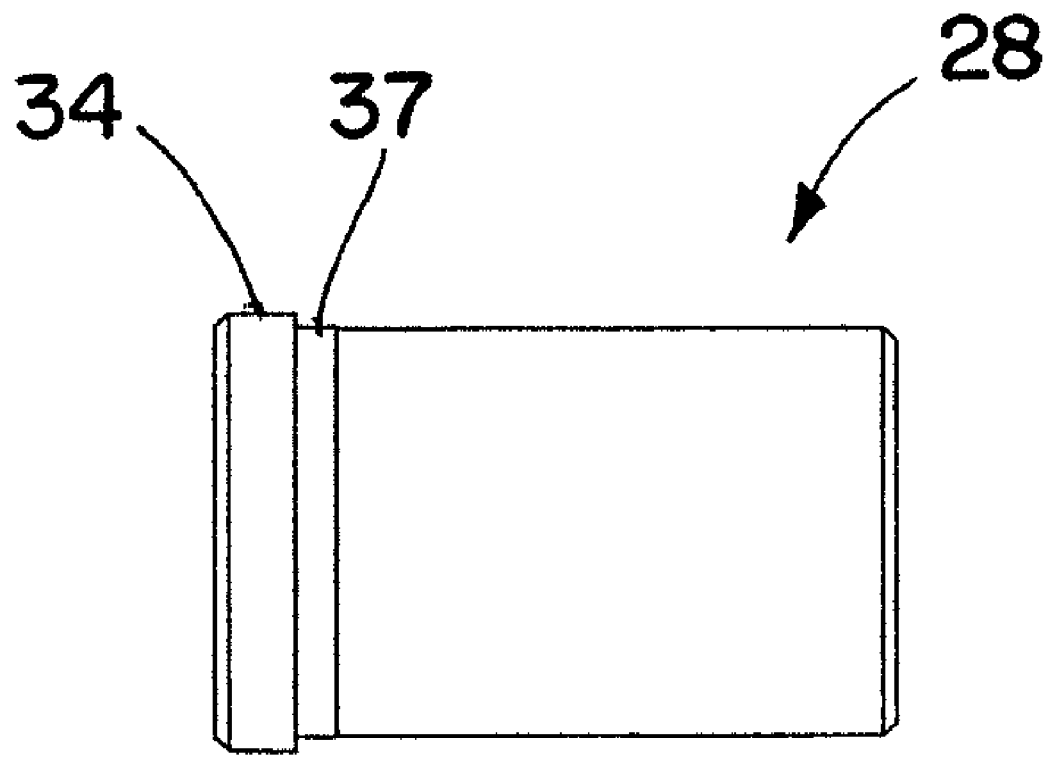
FIG. 8 is a side elevational view of an inlet end cap.

Turning to FIGS. 2 and 3, and initially to FIG. 2, the air dryer 16 is illustrated in partial cut-away cross-section. The air dryer 16 includes a membrane module 24, inlet end cap 28 including inlet port 18, outlet end cap 30 including outlet port 20, and tubular shroud 32. As best seen in FIG. 3, the inlet end cap 28 and outlet end cap 30 are threadedly engaged with threads on respective ends of the membrane module 24. The tubular shroud 32 extends between the inlet and outlet end caps 28 and 30 and surrounds the membrane module 24. In the illustrated embodiment, the tubular shroud 32 is captured between respective radially outwardly extending shoulders 34 and 36 on the inlet and outlet end caps 28 and 30. A watertight seal can be provided between the inlet end cap 28 and the tubular shroud 32. This can be accomplished with seal members such as o-rings, or by provided a raised bead 37 on the inlet end cap 28 that fits within the tubular shroud 32 immediately adjacent its end, for example as shown in FIG. 8.

Figure 4:
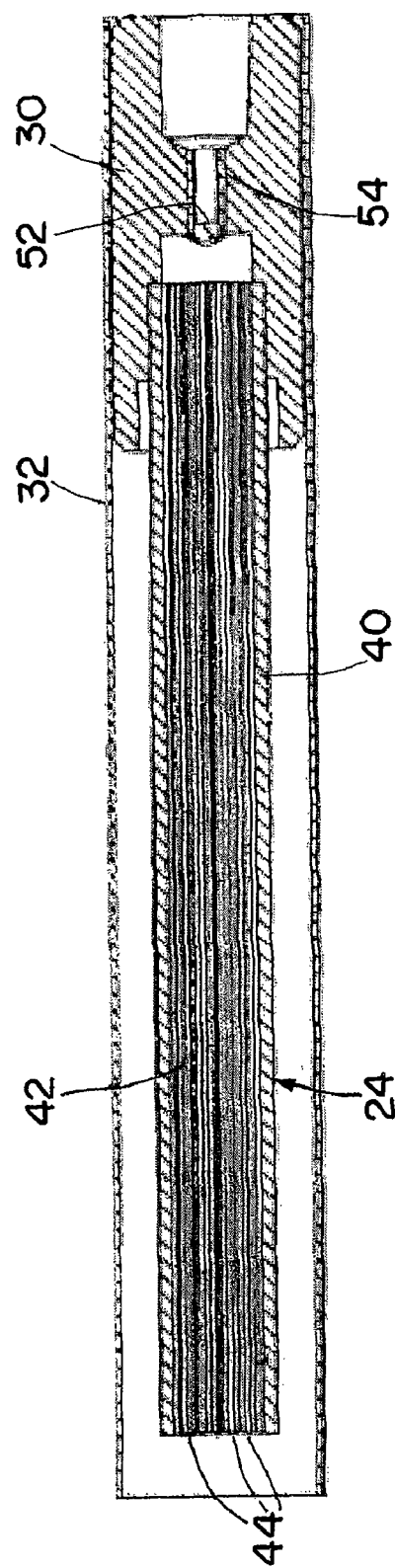
FIG. 4 is a cross-sectional view of the air dryer of FIGS. 2 and 3 with some components removed for clarity.
Figure 5:
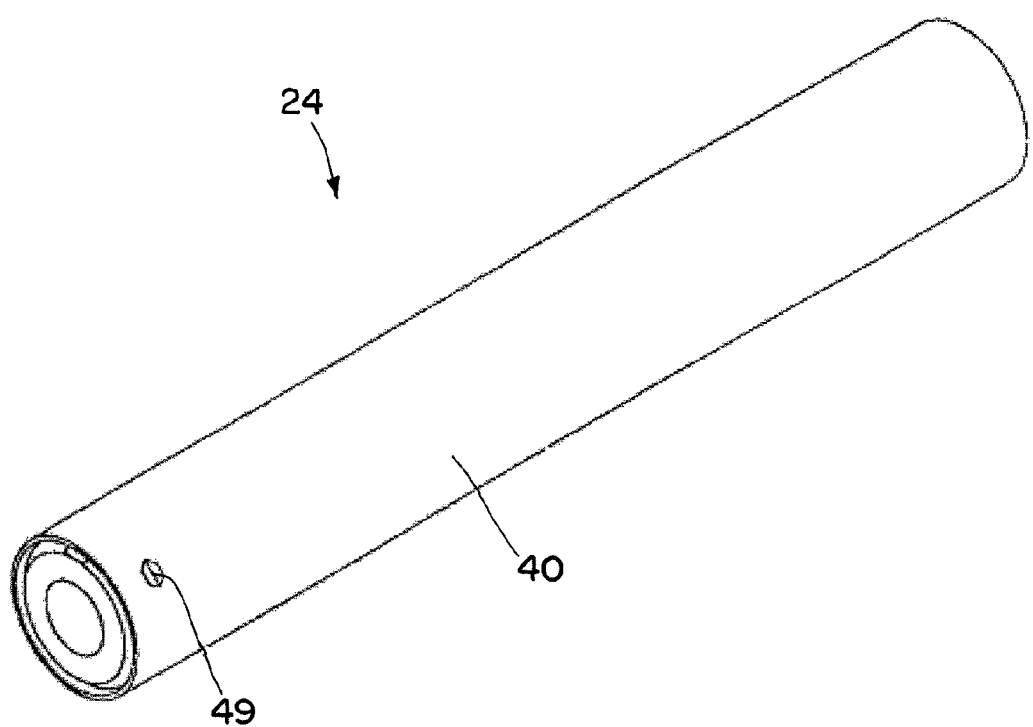
FIG. 5 is a perspective view of an exemplary membrane module.

With additional reference to FIGS. 4 and 5, the membrane module 24 generally includes a cylindrical membrane core 40 and a plurality of hollow fibers 42 supported therein. The hollow fibers 42 have passageways for the flow of the gas (e.g., air) to be dried. Interstitial spaces 44 between the plurality of hollow fibers 42 provide a flowpath for sweep gas to drive away moisture that permeates the hollow fibers 42. As will be appreciated, the hollow fibers 42 can be made from a variety of materials including, but not limited to Polysulfone, Polyethersulfone, Polyimide, Polyamide, Polyvinylpyrrolidone, Polyphenylene Oxide, Polyphenylsulfone, & Polyvinylidene Fluoride, for example.

The passageways in the hollow fiber 42 and the interstitial spaces 44 between the hollow fibers 42 are generally fluidicly isolated. In this sense, air flowing through the passageways of the fibers 42 enters the upstream end and exits the downstream end, while moisture in the air permeates the hollow fibers 42 to the interstitial spaces 44. The ends of the membrane module 24 are sealed such that air from the inlet 18 may generally only flow into the passageways in the hollow fibers 42 and not to the interstitial spaces 44 between the hollow fibers 42. As will be described in more detail below, the membrane core 40 has one or more sweep gas exhaust ports 49 for exhausting sweep gas from within the core 40 of the membrane module 24.

Returning to FIG. 3, it will be appreciated that the inlet and outlet end caps 28 and 30 are threaded onto the membrane module 24, with respective o-rings 46 and 48 forming a seal therebetween. As noted, this provides a generally isolated flow path for the compressed air from the inlet port 18, through the membrane module 24 via the passageways in the hollow fibers 42, to an outlet chamber 50 formed between the outlet end cap 30 and the membrane module 24, to the outlet port 20. In order to provide sweep gas to the interstitial spaces between the hollow fibers 42, a sweep gas orifice 51 is located within the outlet chamber 50 for routing a portion of the dried gas flowing therethrough to the sweep gas circuit.

To regulate the flow of air through the dryer 16, an orifice 52 is provided in the outlet end cap 30. In the illustrated embodiment, the orifice 52 is threaded into a central bore 54 or aperture of the outlet end cap 30. Thus, the orifice 52 is provided as part of a set screw body that can be installed and readily removed from the outlet end cap 30, for example through the outlet port 20. This permits various size orifices to be installed to generate different flow rates and/or dewpoint suppression for different applications. Alternatively, several different outlet end caps could be provided with different orifice sizes, and the entire outlet end cap could be change out as desired. In some cases, it may be desirable to press fit the orifice 52 into the bore 54. The orifice 52 generally controls the flow from the outlet of the membrane module 24 through the central bore 54.

Figure 6:
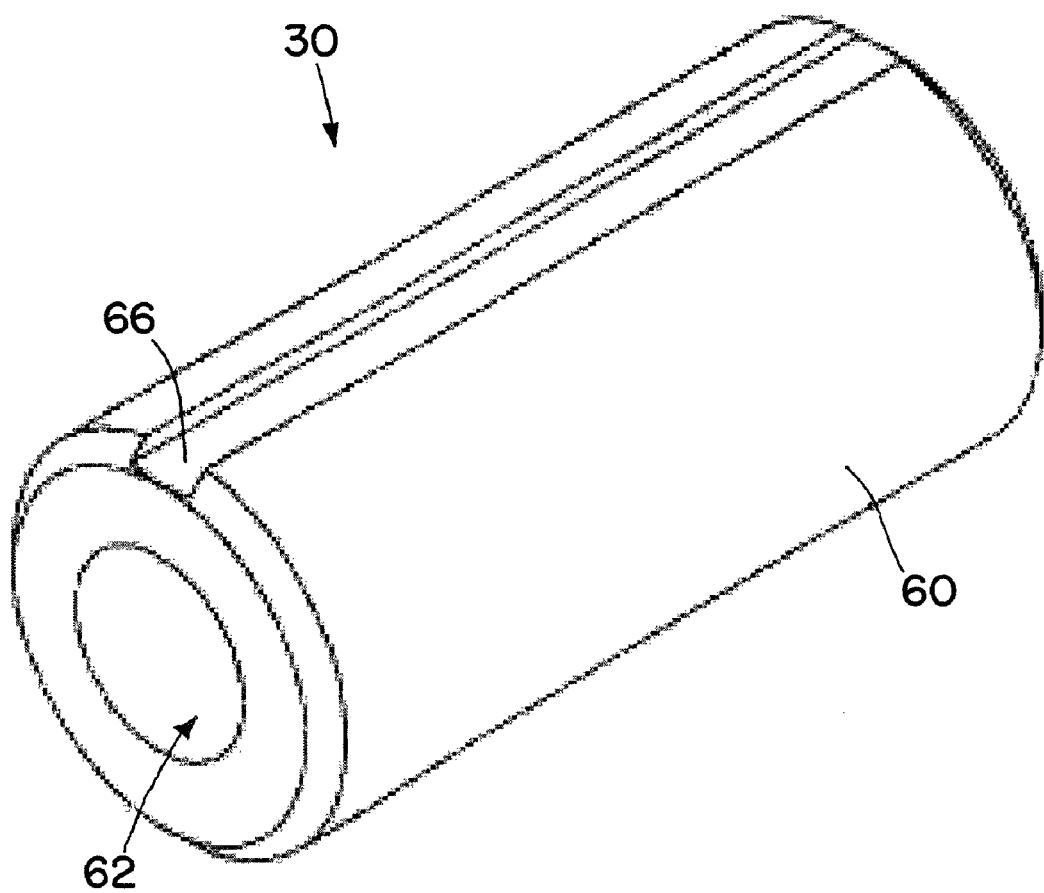
FIG. 6 is a perspective view of an outlet end cap in accordance with the invention.
Figure 7:
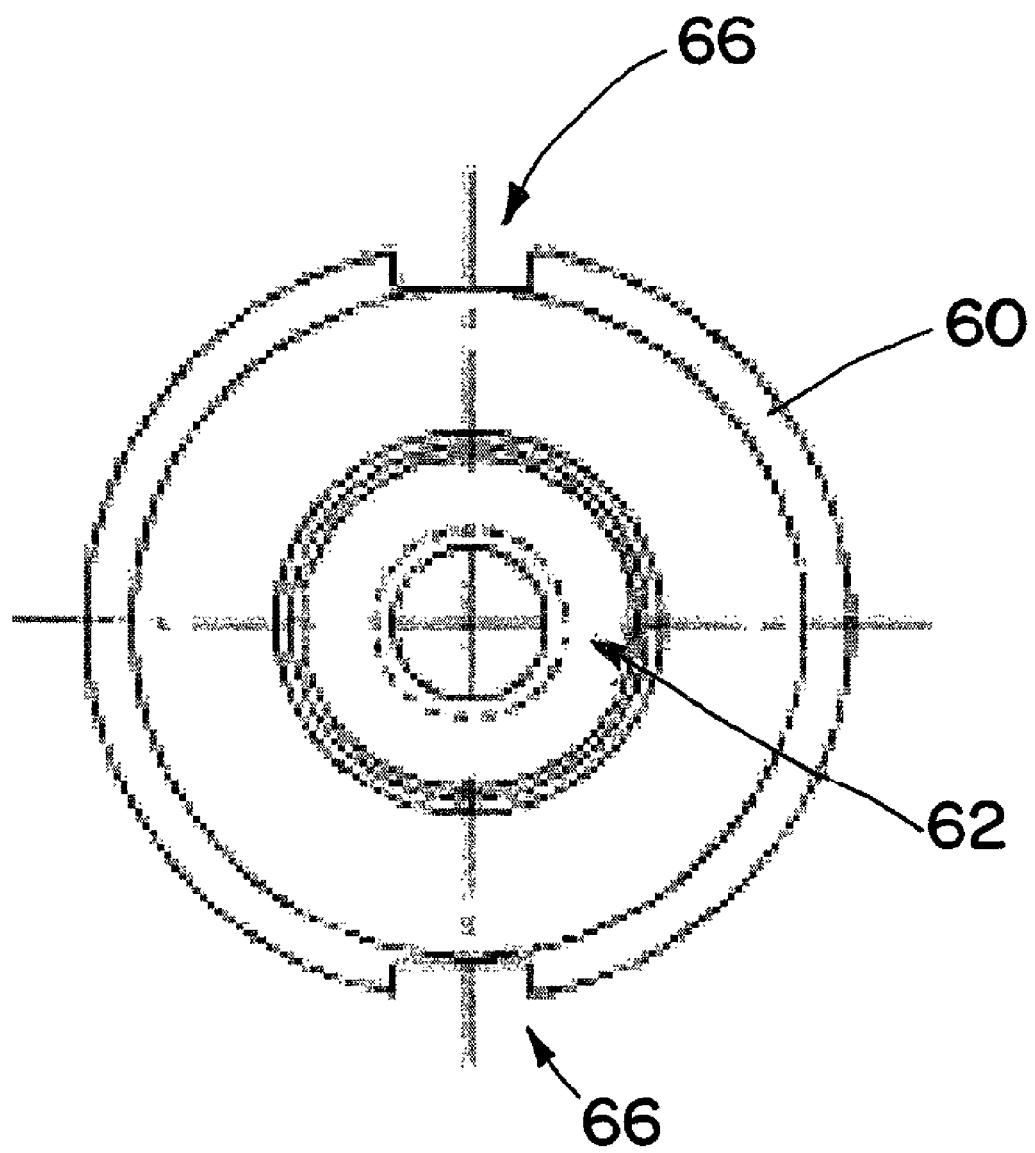
FIG. 7 is an end view of the outlet end cap of FIG. 5.

Turning to FIGS. 6 and 7, the outlet end cap 30 is illustrated in detail. The outlet end cap 30 has a generally cylindrical body 60 including the axially extending central bore 54. The opening of the bore 54 visible in FIG. 6 is adapted for receiving an outlet end of the membrane module 24. As such, internal threads can be provided on the interior of the bore 54 adjacent such opening for threadedly engaging corresponding threads on the membrane module 24. The opposite opening of the bore 62 (not visible in FIG. 6) is adapted for receiving the outlet port 20. A pair of axially extending sweep gas exhaust channels 66 in the outer circumferential surface of the body 60 cooperate with the tubular shroud 32 to form sweep gas exhaust passageways for exhausting the sweep gas from the air dryer 10.

Figure 9:
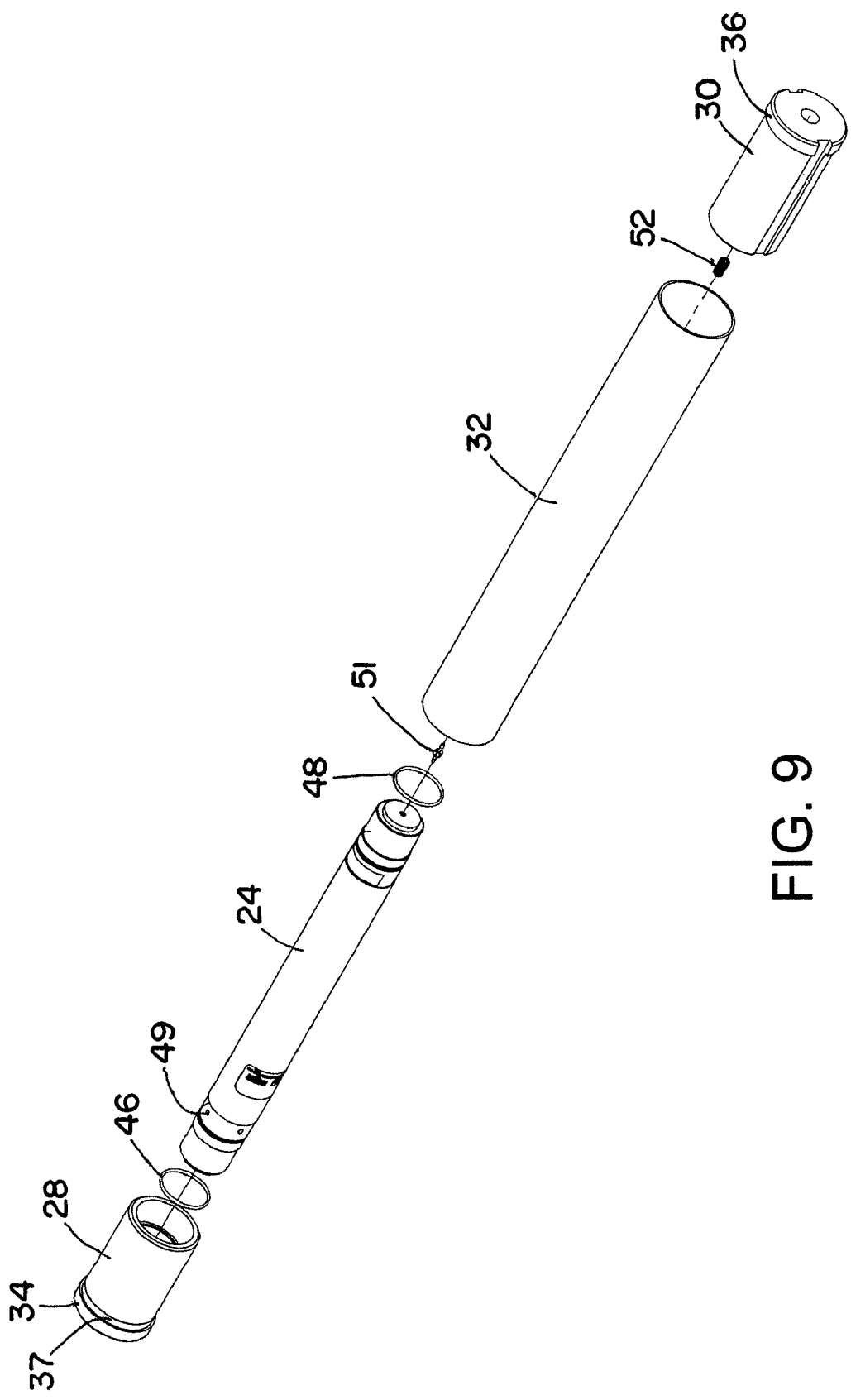
FIG. 9 is an exploded view of the exemplary air dryer of FIGS. 2-4.

With reference to FIG. 9, the air dryer 16 is illustrated in an exploded state that shows the manner in which the various components are arranged when assembled. As will be appreciated, during assembly the inlet end cap 28 is connected to the membrane module 24, the tubular shroud 32 is then telescoped over the membrane module 24, and the outlet end cap 30 is then connected to the end of the membrane module 24 thereby trapping the tubular shroud between the shoulders 34 and 36 of the end caps.

Referring back to FIGS. 2 and 3, in operation compressed air is fed to the inlet port 18 from a compressed air supply, such as a compressor or accumulator tank. The compressed air then passes through the inlet end cap 28 and into the passageways of the hollow fibers 42. As the air passes through the hollow fibers 42, moisture in the air permeates the fibers 42 thereby drying the air. The dried air then exits the hollow fibers 42 into the chamber 50 formed by the outlet end cap 30 and the membrane module 24. A majority of the dried air then flows through the orifice 52 to the outlet port 20 for supply to an electrical cabinet or other device. A portion of the dried air is routed back to the interstitial spaces 44 between the hollow tubes via sweep orifice 51. This sweep gas serves to absorb the moisture that has permeated the hollow tubes 42 and to carry such moisture out of the membrane module 24 via cartridge exhaust ports 49 (See FIG. 5) in the membrane core 40. The sweep gas then flows in the annular space between the tubular shroud 32 and the membrane module 24, generally defining a longitudinally extending passageway, to the exhaust channels 66 of the outlet end cap 30. The sweep gas then exits the air dryer 16 through the passageways formed between the tubular shroud 32 and the channels 66 in the outlet end cap 30.

As will now be appreciated, the internal orifice 52 of the air dryer 16 provides a consistent and more stable outlet flow and dew point. By using the internal orifice 52 to preset the outlet flow and dew point, the air dryer 16 is more user friendly and eliminates the uncertainty associated with having to measure and set the outlet flow and dew point. This feature is especially advantageous in applications, such as a food plant setting, that may lack the instruments to measure outlet flow and dew point.

Further, the tubular shroud 32 of the air dryer 16 provides a more uniform surface that is free of catch points where food and/or other debris may catch and allow bacteria to grow. The tubular shroud also protects the membrane module 24 from harsh cleaning chemicals and provides a longitudinal passageway for the sweep gas enabling a bottom vent arrangement that is less prone to contamination or clogging from cleaning solutions and/or food particles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A membrane air dryer, comprising:
 a tubular hollow fiber membrane module;
 a tubular shroud enclosing the hollow fiber membrane module; and
 an outlet end cap including an outlet end cap body connected to an outlet end of the hollow fiber membrane module, the outlet end cap body having a central aperture fluidly connected with an outlet of the membrane module, and at least one flow path externally spaced from the aperture and fluidly connected with an external sweep air region formed between the tubular membrane module and the tubular shroud; and
 wherein the at least one flow path is formed by a channel along the exterior surface of the outlet end cap body, and the flow path is defined between the outlet end cap body and shroud.

2. A membrane air dryer as set forth in claim 1, wherein the outlet end cap includes an orifice for regulating flow through the aperture from the outlet end of the hollow fiber membrane module.

3. A membrane air dryer as set forth in claim 2, wherein the outlet end cap further includes an orifice body fixed within the central aperture of the end cap body, and defining the orifice.

4. A membrane air dryer as set forth in claim 3, wherein the orifice body is press-fit within the central aperture.

5. A membrane air dryer as set forth in claim 3, wherein the orifice body is threadably received within the central aperture.

6. A membrane air dryer as set forth in claim 1, wherein the outlet end cap is removably connected to the membrane module.

7. A membrane air dryer as set forth in claim 1, further comprising an inlet end cap including an inlet end cap body connected to an inlet end of the hollow fiber membrane module.

8. A membrane air dryer as set forth in claim 7, wherein a watertight seal is provided between the inlet end cap and the tubular shroud.

9. A membrane air dryer as set forth in claim 7, wherein the tubular shroud is captured between the inlet end cap and the outlet end cap.

10. A membrane air dryer as set forth in claim 1, wherein the tubular hollow fiber membrane module has an inlet, an outlet and a bundle of hollow fibers supported therein and surrounded by a core, at least one of the hollow fibers having an interior passageway for the flow of air through the module from an upstream end near the inlet to a downstream end near the outlet, the hollow fibers having interstitial spaces therebetween for the flow of a sweep gas.

11. A membrane air dryer comprising:
a tubular hollow fiber membrane module having an inlet, an outlet and a bundle of hollow fibers supported therein and surrounded by a core, at least one of the hollow fibers having an interior passageway for the flow of air through the module from an upstream end near the inlet to a downstream end near the outlet, the hollow fibers having interstitial spaces therebetween for the flow of a sweep gas; and
an outlet end cap including an outlet end cap body connected to the outlet end of the membrane module, the outlet end cap body having a central aperture fluidly connected with the outlet of the membrane module and having an orifice for regulating flow through the aperture from the outlet end of the membrane module; and
an inlet end cap including an inlet end cap body attached to the inlet of the membrane module, the inlet end cap and outlet end cap being secured to respective ends of the membrane module and in fluid communication with the interior passageways of the hollow fibers, and a tubular shroud surrounding the membrane module and captured between the inlet and outlet end caps, the tubular shroud and membrane module defining a longitudinally extending passageway for the flow of sweep gas.

12. A membrane air dryer as set forth in claim 11, wherein the orifice is included in an orifice body fixed within the central aperture of the end cap body.

13. A membrane air dryer as set forth in claim 12, wherein the orifice body is press-fit within the central aperture.

14. A membrane air dryer as set forth in claim 12, wherein the orifice body is threadably received within the central aperture.

15. A membrane air dryer as set forth in claim 11, wherein the outlet end cap is removably connected to the membrane module.

16. A membrane air dryer as set forth in claim 11, further comprising a passageway for supplying a sweep gas to interstitial spaces between the hollow fibers, the passageway fluidly connecting the outlet end of the membrane module to the interstitial spaces such that a portion of the air flowing through the hollow fibers can be utilized as sweep gas to remove moisture from the interstitial spaces.

17. A membrane air dryer as set forth in claim 11, further comprising a sweep gas inlet orifice for controlling the flow of sweep gas through the passageway to the interstitial spaces.

18. A method of assembling a membrane air dryer as set forth in claim 11, comprising the steps of:
connecting one of the inlet and outlet end caps to a first end of the tubular hollow membrane module;
telescoping the tubular shroud over the membrane module; and
attaching the other of the inlet and outlet end caps to a second end of the tubular hollow membrane module while capturing the tubular shroud between the first and second end caps.

19. A membrane air dryer comprising:
a tubular hollow fiber membrane module having an inlet, an outlet and a bundle of hollow fibers supported therein and surrounded by a core, at least one of the hollow fibers having an interior passageway for the flow of air through the module from an upstream end near the inlet to a downstream end near the outlet, the hollow fibers having interstitial spaces therebetween for the flow of a sweep gas;
an outlet end cap including an outlet end cap body connected to the outlet end of the membrane module, the outlet end cap body having a central aperture fluidly connected with the outlet of the membrane module and having an orifice for regulating flow through the aperture from the outlet end of the membrane module; and
an inlet end cap including an inlet end cap body attached to the inlet of the membrane module, the inlet end cap and outlet end cap being secured to respective ends of the membrane module and in fluid communication with the interior passageways of the hollow fibers, and a tubular shroud surrounding the membrane module and extending between the inlet and outlet end caps, the tubular shroud and membrane module defining a longitudinally extending passageway for the flow of sweep gas; and
wherein the membrane module has at least one exhaust port for exhausting sweep gas from within the membrane module into the longitudinally extending passageway, and wherein the outlet end cap has at least one exhaust channel through which the sweep gas can vent from the longitudinally extending passageway.

20. A membrane air dryer as set forth in claim 19, wherein the at least one exhaust channel extends axially on an outer circumference of the outlet end cap body, the tubular shroud and outlet end cap being axially coextensive along a portion of the exhaust channel.

* * * * *